United States Patent [19]
Eida et al.

[11] Patent Number: 5,811,209
[45] Date of Patent: Sep. 22, 1998

[54] COLOR FILTER, PRODUCTION PROCESS THEREOF, AND LIQUID CRYSTAL DISPLAY PANEL EQUIPPED WITH THE COLOR FILTER

[75] Inventors: Tsuyoshi Eida, Yokohama; Katsuhiro Shirota, Kawasaki; Takeshi Miyazaki, Ebina, all of Japan

[73] Assignee: Canon Kabushiki Kaisha, Tokyo, Japan

[21] Appl. No.: 531,343

[22] Filed: Sep. 20, 1995

[30] Foreign Application Priority Data

Sep. 21, 1994 [JP] Japan .................................. 6-226192
Sep. 13, 1995 [JP] Japan .................................. 7-235112

[51] Int. Cl.⁶ .......................... G02B 5/20; G02F 1/1335
[52] U.S. Cl. ........................... 430/7; 349/106; 347/106; 427/492; 427/511; 427/164
[58] Field of Search ................. 430/7; 427/492, 427/511, 164, 168, 372.2; 349/106; 347/106, 107

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,418,284 | 11/1983 | Ogawa et al. | 250/578 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,698,113 | 10/1987 | Ogawa | 156/275.7 |
| 4,701,837 | 10/1987 | Sakaki et al. | 347/105 |
| 4,723,129 | 2/1988 | Endo et al. | 346/1.1 |
| 4,740,796 | 4/1988 | Endo et al. | 346/1.1 |
| 4,818,075 | 4/1989 | Takao et al. | 350/339 F |
| 4,832,984 | 5/1989 | Hasegawa et al. | 427/161 |
| 4,846,556 | 7/1989 | Haneda | 350/317 |
| 4,864,324 | 9/1989 | Shirota et al. | 346/1.1 |
| 4,965,612 | 10/1990 | Sakaki et al. | 346/1.1 |
| 4,981,614 | 1/1991 | Miyazaki et al. | 252/587 |
| 4,995,705 | 2/1991 | Yoshinaga et al. | 350/350 |
| 5,011,623 | 4/1991 | Yoshinaga et al. | 252/299.5 |
| 5,039,208 | 8/1991 | Ohnishi et al. | 359/100 |
| 5,079,214 | 1/1992 | Long et al. | 503/227 |
| 5,190,794 | 3/1993 | Yoshino et al. | 427/162 |
| 5,278,009 | 1/1994 | Iida et al. | 430/7 |
| 5,281,450 | 1/1994 | Yaniv | 427/165 |
| 5,317,434 | 5/1994 | Ohara | 359/68 |
| 5,340,619 | 8/1994 | Chen et al. | 427/165 |
| 5,358,558 | 10/1994 | Yamamoto et al. | 106/22 R |
| 5,418,094 | 5/1995 | Sato et al. | 430/7 |
| 5,420,708 | 5/1995 | Yokoyama et al. | 359/67 |
| 5,552,192 | 9/1996 | Kashiwazaki et al. | 427/492 |

FOREIGN PATENT DOCUMENTS

| | | |
|---|---|---|
| 0400738 | 12/1990 | European Pat. Off. . |
| 0452922 | 10/1991 | European Pat. Off. . |
| 0552035 | 7/1993 | European Pat. Off. . |
| 0603898 | 6/1994 | European Pat. Off. . |
| 54-056847 | 5/1979 | Japan . |
| 59-075205 | 4/1984 | Japan . |
| 59-123670 | 7/1984 | Japan . |
| 59-138461 | 8/1984 | Japan . |
| 60-71260 | 4/1985 | Japan . |
| 61-77014 | 4/1986 | Japan . |
| 62-025171 | 2/1987 | Japan . |
| 63-235901 | 9/1988 | Japan . |
| 63-253302 | 10/1988 | Japan . |
| 63-294503 | 12/1988 | Japan . |
| 01217320 | 8/1989 | Japan . |
| 1217302 | 8/1989 | Japan . |
| 01235903 | 9/1989 | Japan . |
| 02228605 | 9/1990 | Japan . |
| 03 10220 | 1/1991 | Japan . |
| 4123005 | 4/1992 | Japan . |
| 04317007 | 11/1992 | Japan . |
| 04349401 | 12/1992 | Japan . |
| 05173010 | 7/1993 | Japan . |
| 05288913 | 11/1993 | Japan . |
| 2149415 | 6/1985 | United Kingdom . |
| 93 24240 | 12/1993 | WIPO . |

OTHER PUBLICATIONS

Patent Abstracts of Japan, vol. 13, No. 530 (Nov. 1989) (P–966).
Patent Abstracts of Japan, vol. 16, No. 382 (Aug. 1992) (P–1403).
Patent Abstracts of Japan, vol. 16, No. 197 (May 1992) (P–1350).
Patent Abstracts of Japan, vol. 17, No. 526 (Sep. 1993) (P–1617).
Patent Abstracts of Japan, vol. 17, No. 703 (Dec. 1993) (P–1666).
Patent Abstracts of Japan, vol. 8, No. 183 (Aug. 1984) (P–296).
Patent Abstracts of Japan, vol. 13, No. 37 (Jan. 1989) (P–819).

*Primary Examiner*—John A. McPherson
*Attorney, Agent, or Firm*—Fitzpatrick, Cella, Harper & Scinto

[57] ABSTRACT

Disclosed herein is a process for producing a color filter, arranged with a plurality of colored pixels on the base, by applying inks of red, blue and green colors onto a base by an ink-jet system, wherein at least one of the blue and green inks comprises a dye selected from the group consisting of C.I. Direct Blue 86, C.I. Direct Blue 87 and C.I. Direct Blue 199.

44 Claims, 10 Drawing Sheets

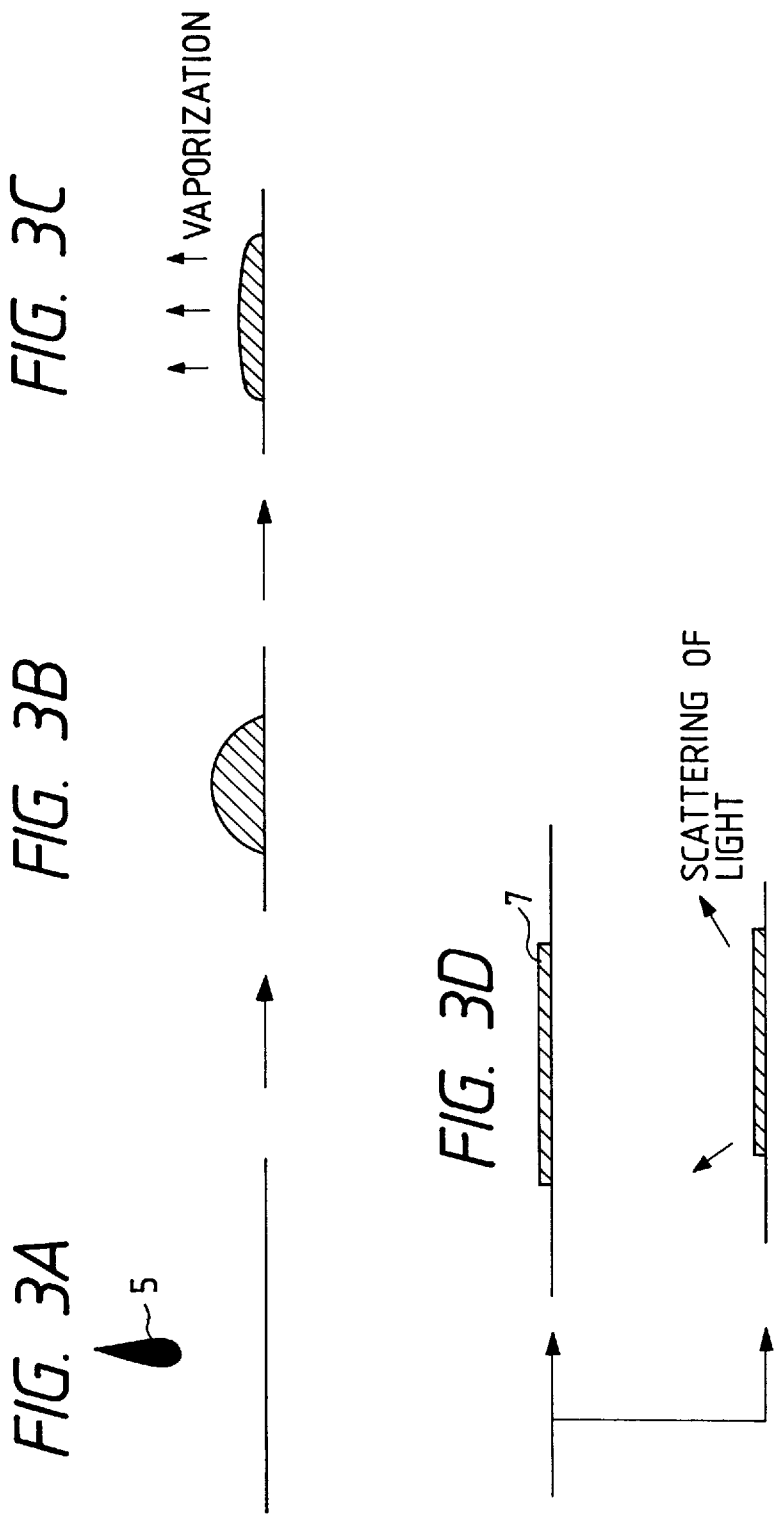

COLOR FILTER, PRODUCTION PROCESS THEREOF, AND LIQUID CRYSTAL DISPLAY PANEL EQUIPPED WITH THE COLOR FILTER

BACKGROUND OF THE INVENTION

1. Field of the Invention

The present invention relates to a production process of a color filter suitable for use in color liquid crystal display device used in color televisions, personal computers, etc., and the like, and further particularly to a production process of a color filter making use of an ink-jet recording technique, a color filter produced in accordance with the production process and a liquid crystal display panel incorporating the color filter therein.

2. Related Background Art

A color filter is an important component for a color liquid crystal display device and has a structure that many pixels separately composed of three primary colors of red (R), green (G) and blue (B) are arranged repeatedly on a transparent base.

With the advancement of personal computers, particularly, portable personal computers in recent years, the demand for liquid crystal display devices, particularly, color liquid crystal display devices tends to increase. It is however necessary to reduce the cost of the color liquid crystal display devices for further spreading them. There is an increasing demand for reduction in the cost of color filters particularly given much weight from the viewpoint of the cost.

Various processes have heretofore been attempted for meeting the above demand while satisfying properties required of the color filters. However, no process satisfying all the required properties is yet established under the circumstances.

The typical production processes of color filters will hereinafter be described.

The first method most often used is a dyeing process. In the dyeing process, a sensitizing agent is added to a water-soluble polymeric material, which is a material to be dyed, to sensitize the polymeric material. The thus-sensitized polymeric material is applied to a transparent base, and the coating film thus formed is patterned in the desired form by a photolithographic process. Thereafter, the base on which the coating film has been patterned is immersed in a dye bath to obtain a colored pattern. This process is repeatedly performed three times to form a color filter composed of colored patterns of R, G and B.

The second method often used is a pigment dispersing process which has been replacing the dyeing process in recent years. In this process, a layer of a photosensitive resin in which a pigment has been dispersed is first formed on a base and then subjected to patterning, thereby obtaining a pattern of a single color. This process is repeatedly performed three times, thereby forming a color filter composed of three colored patterns of R, G and B.

As the third method, there is an electrodepostion process. In this process, a transparent electrode is first patterned on a base. The base is then immersed in an electrodeposition coating fluid containing a pigment, resin, electrolytic solution and the like to electrically deposit the first color. This process is repeatedly performed three times, thereby forming a color filter layer composed of three colored patterns of R, G and B. Finally, this color filter layer is calcined to form a color filter.

As the fourth method, there is a printing process in which three coatings of R, G and B colors, each comprising a thermosetting resin and a pigment dispersed therein, are separately applied by repeated printing, and the resin to become each colored layer is then thermoset to form a colored layer, thereby forming a color filter.

It is common to form a protective layer on the colored layer in each process.

The need of repeating the same process three times to form the colored patterns of R, G and B is common to these processes. Therefore, the production cost is necessarily increased. There is also offered a problem that a yield is reduced as the number of processes increases.

In the third process by the electrodeposition, besides, formable patterns are limited. It is hence difficult to apply this process to a TFT color liquid crystal display device in the existing technique. Further, the fourth process involves a drawback that resolution and smoothness are poor, and is hence unfit to form fine-pitch patterns.

In order to eliminate these drawbacks, processes for producing a color filter by using an ink-jet system have been proposed (refer to Japanese Patent Application Laid-Open Nos. 59-75205, 63-235901, 1-217302 and 4-123005, etc.).

These processes are different from the above-described conventional processes. In these processes, coloring solutions (hereinafter referred to as inks) separately containing coloring matters of R, G and B colors are ejected from respective nozzles on a filter base, and the inks are dried on the filter base to form pixels. According to these processes, the formation of the individual colored patterns of R, G and B can be performed at once, and moreover the amount of the inks to be used is saved. Therefore, they have effects of enhancing productivity to a great extent and reducing the cost.

However, these conventional processes of producing a color filter by the ink-jet system do not provide any color filter satisfying all the following properties required for reasons of the fact that dyes used are not always suitable for the ink-jet system, and so on:

(1) High precision of impact of ink-droplets when ejected from an ink-jet head;

(2) Good transparency of colored portions (pixels);

(3) No bleeding at colored portions (pixels); and (4) High light-fastness of colored portions (pixels).

There is thus a demand for establishing a method of promptly solving the above-described problems.

SUMMARY OF THE INVENTION

The present invention has thus been completed with a view toward solving the above problems and has as its object the provision of a color filter satisfying all the above required properties, a production process thereof and a liquid crystal display panel equipped with the color filter.

The above object can be achieved by the present invention described below.

According to the present invention, there is thus provided a process for producing a color filter, arranged with a plurality of colored pixels on the base by, applying inks of red, blue and green colors onto a base by an ink-jet system, wherein at least one of the blue and green inks comprises a dye selected from the group consisting of C.I. Direct Blue 86, C.I. Direct Blue 87 and C.I. Direct Blue 199.

According to the present invention, there is also provided a process for producing a color filter by applying inks of red, blue and green colors to a base having light-screening areas and light-transmitting areas by an ink-jet system to arrange colorants on the base, which comprises the steps of:

(1) providing a resin layer which is capable of setting by light irradiation or light irradiation and heating and is ink-receptive onto the base;

(2) setting a part of the resin layer on the light-screening areas by light irradiation or light irradiation and heating;

(3) applying colorants to unset portions of the resin layer by the ink-jet system using at least a blue or green ink comprising a dye selected from the group consisting of C.I. Direct Blue 86, C.I. Direct Blue 87 and C.I. Direct Blue 199; and (4) setting the colored portions of the resin layer by light irradiation or light irradiation and heating.

According to the present invention, there is further provided a color filter produced by any one of the processes described above.

According to the present invention, there is still further provided a color filter arranged with pixels colored in red, green and blue, wherein at least one of the portions colored in blue and green contains a dye selected from the group consisting of C.I. Direct Blue 86, C.I. Direct Blue 87 and C.I. Direct Blue 199.

According to the present invention, there is yet still further provided a color filter comprising a base having light-screening areas and light-transmitting areas, and a resin layer provided thereon and the resin layer having portions colored in red, blue and green, wherein the resin layer on the light-screening areas has a colored portion and an uncolored portion, and at least one of the portions colored in blue and green contains a dye selected from the group consisting of C.I. Direct Blue 86, C.I. Direct Blue 87 and C.I. Direct Blue 199.

According to the present invention, there is yet still further provided a liquid crystal display panel comprising any one of the color filters described above, a panel base provided in an opposing relation with the color filter and a liquid crystal composition enclosed in a space between the color filter and the panel base.

According to the present invention, there is yet still further provided an information processor equipped with the liquid crystal display panel described above.

BRIEF DESCRIPTION OF THE DRAWINGS

FIGS. 3A through 3E illustrate the behavior of an ink on an ink-receiving layer.

DESCRIPTION OF THE PREFERRED EMBODIMENTS

The present invention will hereinafter be described in detail by reference to the drawings.

FIGS. 1A through 1E illustrate a production process of a color filter according to the present invention and show an exemplary construction of a color filter for a liquid crystal display device according to the present invention.

In the present invention, a glass base is generally used as a base. However, the base is not limited to the glass base so far as it has properties required of the color filter for liquid crystal display device, such as transparency and mechanical strength, and a resin film may hence be used.

Figure 1A:
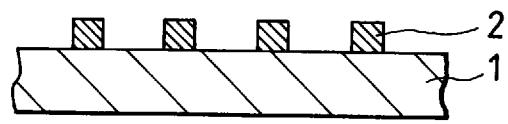
FIGS. 1A through 1E are process drawings illustrating a production process of a color filter according to an embodiment of the present invention.

FIG. 1A shows a glass base 1 on which black matrices 2 have been formed. As examples of a method of forming the black matrices, may be mentioned, in the case where the black matrices are provided directly on the base, a method in which a thin film of a metal is formed on the base by sputtering or vacuum deposition, and this film is patterned by a photolithographic process, or in the case where the black matrices are provided on a resin composition, a method of patterning by a common photolithographic process, to which, however, are not limited.

A material for the black matrices is also not limited to metals, and resins may be used so far as they have a function as a black matrix. The black matrices are not required to be formed on a base on which a color filter is to be formed, and may be provided on the side of a base opposite to the color filter (Black matrix on Array).

Figure 1B:
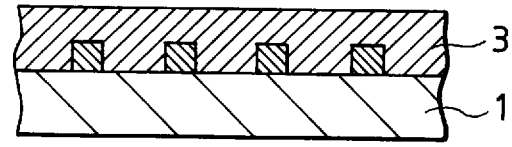

A layer containing a resin composition capable of setting by light and/or heat is formed on the base on which the black matrices 2 have been formed, thereby forming an ink-receiving layer 3 on the base 1 (FIG. 1B).

Any known material may be used as a material for forming the ink-receiving layer 3. For example, taking heat resistance and the like into consideration, acrylic resins, epoxy resins and imide resins are preferred. Taking water-based ink absorptivity into consideration, those containing a water-soluble cellulosic polymer such as hydroxypropylcellulose, hydroxyethylcellulose, methylcellulose or carboxymethylcellulose are preferred. Besides, polyvinyl pyrrolidone, polyvinyl alcohol, polyvinyl acetal, polyurethane, carboxymethylcellulose, polyester, and natural resins such as albumin, gelatin, casein, starch, cationic starch, gum arabic and sodium alginate may be mentioned.

Of these, a mixture of hydroxypropylcellulose and methylolmelamine, or a compound containing at least a homopolymer of a water-soluble acrylic monomer composed of the following structural unit and/or its copolymer with another vinyl monomer is particularly preferred taking account of the transparency and bleeding of the colored portions, the light fastness of dyes, and the like as described above, in addition to the heat resistance and ink absorptivity.

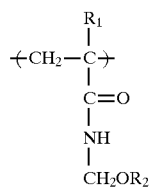

wherein $R_1$ denotes H or $CH_3$, and $R_2$ denotes H or an alkyl group having 1 to 5 carbon atoms.

The ink-receiving layer 3 may contain various additives if needed. Specific examples of the additives include various kinds of surfactants, dye-fixing agents (water-proofings), antifoaming agents, antioxidants, optical whitening agents, ultraviolet absorbents, dispersants, viscosity modifiers, pH adjustors, mildewproofing agents and plasticizers. These additives may be freely selected from the conventionally-known compounds as necessary for the end application intended.

A process such as spin coating, roll coating, bar coating, spray coating or dip coating may be used for forming the ink-receiving layer.

Figure 1C:
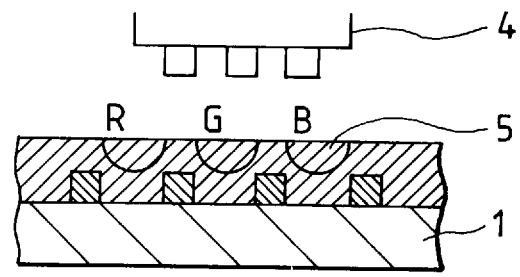

After the ink-receiving layer thus formed is prebaked, if needed, it is colored with respective inks of R, G and B colors, at least one of said G and B inks comprising a dye selected from the group consisting of C.I. Direct Blue 86, C.I. Direct Blue 87 and C.I. Direct Blue 199, by an ink-jet system (FIG. 1C). As the inks used in the coloring, there may be used both dye inks and pigment inks. Both liquid inks and solid inks may also be used. In particular, water-based inks may preferably be used in the present invention. In FIG. 1C, reference numerals 4 and 5 designate an ink-jet head and an ink impacted on the ink-receiving layer, respectively.

In the present invention, at least one of the G and B inks comprises a dye selected from the group consisting of C.I. Direct Blue 86, C.I. Direct Blue 87 and C.I. Direct Blue 199, whereby favorable effects, which will be described subsequently, can be exhibited. As the dye for a green ink, it is preferable to use a mixture of the above cyan dye with a yellow dye. Examples of preferred yellow dyes include C.I. Acid Yellow 23, and C.I. Direct Yellow 86 and 142. As the dye for a blue ink, it is preferable to use a mixture of the above blue dye with a dye selected from the group consisting of red, magenta and violet dyes. Examples of preferred red, magenta and violet dyes include C.I. Acid Red 145, 157, 289 and 319, and C.I. Acid Violet 9 and 51. As the dye for a red ink, C.I. Acid Red 158 and the forth are used. In a case of a green ink, a mixing ratio of a cyan dye to a yellow dye is from 2:8 to 8:2 by weight, preferably from 2:8 to 7:3. In a case of a blue ink, a mixing ratio of a cyan dye to a red, magenta or violet dye is from 6:4 to 20:1 by weight, preferably from 6:4 to 10:1.

As the ink-jet system, a bubble-jet type making use of an electrothermal converter as an energy-generating element or a piezo-jet type making use of a piezoelectric element may be used. A coloring portion and a coloring pattern may be optionally preset.

A preferable method of ejecting the inks according to the present invention by an ink-jet system to form pixels will hereinafter be described by reference to FIG. 2.

Figure 2:
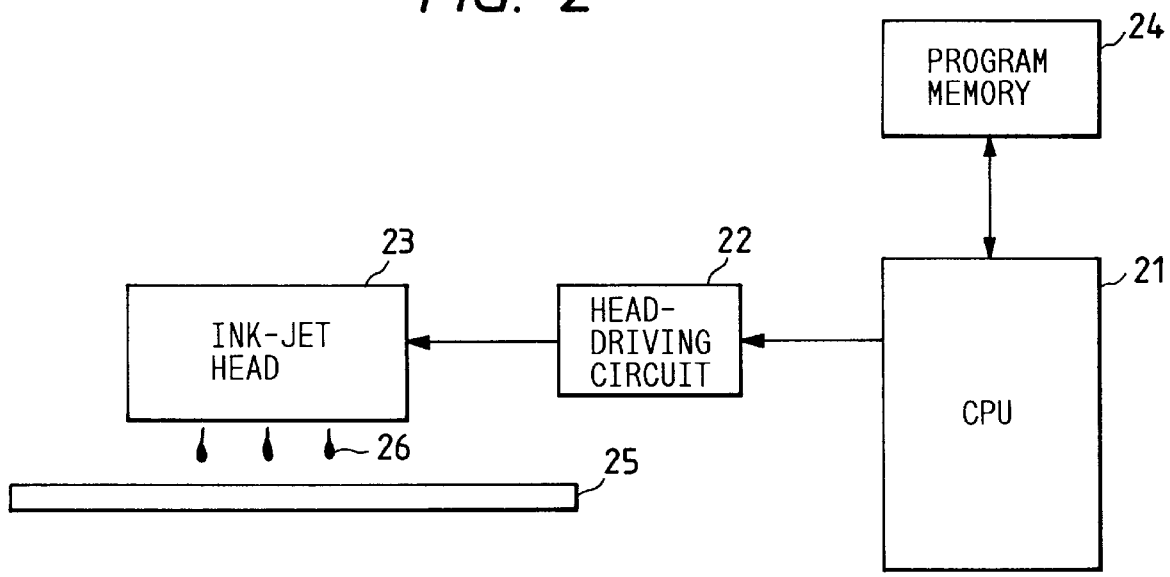
FIG. 2 is a block diagram illustrating a production apparatus of a color filter in accordance with an ink-jet system.

FIG. 2 is a block diagram illustrating a construction of an apparatus used in printing colored portions of a color filter by an ink-jet system. In FIG. 2, CPU 21 is connected to an ink-jet head 23 through a head-driving circuit 22. The control program information in a program memory 24 is inputted into CPU 21. CPU 21 serves to move the ink-jet head 23 to a predetermined position (not shown) so as to bring a desired pixel position on a glass base 25 under the ink-jet head 23, whereby droplets 26 of an ink of the desired color are ejected at that position to color the base. This process is performed over the whole pixel position, thereby producing a color filter.

A property particularly required in this process is the precision of impact of the ink droplets ejected from a nozzle provided in the ink-jet head. If this precision of ink-droplet impact is poor, namely, the impact position of the ink droplet deviates from the intended position, problems of change in color tone due to color mixing with adjacent pixels (or ink droplets) and the occurrence of blank areas (leakage of light through the transparent area) are caused.

As the cause that the precision of ink-droplet impact is deteriorated, mention may be made of the following two causes:

a) uneven wetting of ink on the surface of an orifice of the head; and b) thickening phenomenon of ink at the orifice of a nozzle.

As the first cause a), mention may be made of the fact that the ink is unevenly leaked at the orifices of nozzles arranged in the ejection head, whereby the ejecting direction of the ink is changed irregularly.

The present inventors have carried out an extensive investigation. As a result, it has been found that when a dye particularly high in adsorptivity on the surface of a solid is used as a colorant for an ink, this phenomenon that the ink unevenly wets the orifices frequently occurs, and as a result, the precision of ink-droplet impact is lowered. In general, the molecule of a dye for a color filter is designed so as to quickly dye on the surface of a base. On the other hand, the adsorptivity of the dye on the orifices is also high. Therefore, the precision of ink-droplet impact is often lowered to a significant extent.

As the second cause b) that the precision of ink-droplet impact is lowered, mentioned may be made of the thickening phenomenon of ink at the orifice of a nozzle. This is because the viscosity of the ink increases with the evaporation of water, a low-boiling solvent and the like at the orifice of the nozzle. Among dyes, some dyes markedly show this tendency. If such viscosity increase occurs at the orifice, the ink cannot be smoothly ejected. As a result, the precision of ink-droplet impact is lowered like the above. Therefore, such viscosity increase is not preferred. The ink composition containing the dye according to the present invention causes no lowering in the precision of ink-droplet impact, and is hence preferred.

In order to produce a preferable color filter, it is further necessary to also satisfy the required properties of (2) to (4) as described above. In this regard, a description is given below.

FIGS. 3A through 3E illustrate a process of formation of a pixel (a colored portion) 7 by an ink-jet system. FIG. 3A shows that an ink-droplet 5 is just reaching a base. What markedly differs from the conventional processes is the fact that an ink high in dye concentration is selectively applied only to a pixel-forming portion on the surface of a base for a color filter (FIG. 3B), and water and an organic solvent in the ink are then evaporated (FIG. 3C) to form a pixel 7 (FIG. 3D). Therefore, a dye crystallizes on the surface of the base upon the evaporation of the water and solvent contained in the ink according to the dye used. As a result, the transparency of the pixel may be deteriorated in some cases due to scattering of light (FIG. 3E). In addition, if a small amount of the solvent, which has been unable to evaporate, remains in the pixel, bleeding may also occur due to migration of the dye forming the pixel with time. The presence of the solvent in the pixel may also form the cause of deterioration in light fastness of the pixel under the influence of active oxygen and the like due to thermal decomposition or the like according to the dye used. However, the use of the ink containing the dye according to the present invention can achieve good results in each regard.

The amount of these dyes contained in the ink is within a range of from 0.1 to 15%, preferably from 1 to 10%, more preferably from 2 to 8%.

In order to more effectively achieve the object of the present invention, it is preferable to use organic solvents having the following features as solvents for the inks according to the present invention. Namely, the inks contain:

preferably, 5 to 50% of a solvent having a boiling point of from 150° to 250° C., more preferably, 5 to 50% of a solvent having a boiling point of from 180° to 230° C., and preferably, not more than 30% of a solvent having a boiling point of 250° C. or higher, more preferably, not more than 20% of a solvent having a boiling point of 230° C. or higher.

Specific examples of preferable solvents are shown in Tables 1 to 3.

TABLE 1

| Name of solvent | Boiling point (°C.) |
| --- | --- |
| N,N-Dimethylformamide | 153.0 |
| 1-Methylcyclohexanol | 155.0 |
| 3-Heptanol | 156.2 |
| 2-Ethoxyethyl acetate | 156.3 |
| 1-Hexanol | 157.1 |
| 2-Heptanol | 160.4 |
| Cyclohexanol | 161.0 |
| Furfural | 161.8 |
| N,N-Diethylethanolamine | 162.1 |
| 2-Methylcyclohexanol | 165.0 |
| Abietinol | 165.0 |
| N,N-dimethylacetamide | 166.1 |
| 2-(Methoxymethoxy)ethanol | 167.5 |
| Diacetone alcohol | 168.1 |
| Furfuryl alcohol | 170.0 |
| Ethylene glycol monobutyl ether | 170.2 |
| Monoethanolamine | 171.0 |
| 3-Methylcyclohexanol | 173.0 |
| 4-Methylcyclohexanol | 173.0 |
| 1-Heptanol | 176.3 |
| N,N-Ethylformamide | 177.0 |
| Tetrahydrofurfuryl alcohol | 178.0 |
| 2-Octanol | 178.0 |
| N-Methylformamide | 180.0 |

TABLE 2

| Name of solvent | Boiling point (°C.) |
| --- | --- |
| Ethylene glycol monoisoamyl ether | 181.0 |
| 2,3-Butanediol | 182.0 |
| Ethylene glycol monoacetate | 182.0 |
| Glycerol monoacetate | 182.0 |
| 2-Ethyl-1-hexanol | 184.7 |
| 1,2-Propanediol | 187.3 |
| Dipropylene glycol monomethyl ether | 190.0 |
| Ethylene glycol diacetate | 190.2 |
| 1,2-butanediol | 190.5 |
| Ethylene glycol monobutyl ether acetate | 191.5 |
| 3,5,5-Trimethyl-1-hexanol | 194.0 |
| Diethylene glycol monomethyl ether | 194.1 |
| 1-Octanol | 195.0 |
| 2-Methyl-2,4-pentanediol | 197.1 |
| Dipropylene glycol monoethyl ether | 197.8 |
| Ethylene glycol | 197.9 |

TABLE 2-continued

| Name of solvent | Boiling point (°C.) |
| --- | --- |
| N-methylpyrrolidone | 202.0 |
| Diethylene glycol monoethyl ether | 202.0 |
| γ-Butyrolactone | 204.0 |
| Benzyl alcohol | 205.5 |
| N-Methylacetamide | 206.0 |
| 1,3-Butanediol | 207.5 |

TABLE 3

| Name of solvent | Boiling point (°C.) |
| --- | --- |
| Ethylene glycol monohexyl ether | 208.1 |
| Formamide | 210.5 |
| 1,3-Propanediol | 214.0 |
| 1-Nonanol | 214.0 |
| Diethylene glycol monoethyl ether acetate | 214.7 |
| α-Terpineol | 219.0 |
| Acetamide | 221.2 |
| 1,4-Butanediol | 229.2 |
| Diethylene glycol monobutyl ether | 230.4 |
| 1-Decanol | 231.0 |
| Dipropylene glycol | 231.8 |
| 2-Butene-1,4-diol | 235.0 |
| Ethylene carbonate | 238.0 |
| Propylene carbonate | 242.0 |
| 1,5-Pentanediol | 242.4 |
| 1-Undecanol | 243.0 |
| Tripropylene glycol monomethyl ether | 243.0 |
| 2-Ethyl-1,3-hexanediol | 243.2 |
| Ethylene glycol monophenyl ether | 244.7 |
| Diethylene glycol | 244.8 |
| 2-Pyrrolidone | 245.0 |
| Diethylene glycol monobutyl ether acetate | 246.8 |
| Triethylene glycol monomethyl ether | 249.0 |

Surfactants such as nonionic, anionic and cationic surfactants may also be used in the inks. Besides, additives such as a pH adjustor and mildewproofing agent may also be added if needed.

Figure 1D:
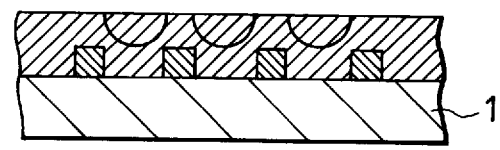

The production process of the color filter according to the present invention will be described by reference to FIGS. 1A to 1E again. After the step of FIG. 1C, the ink-receiving layer composed of the settable composition is set (FIG. 1D). In the method of setting, a heating means is mainly used.

Figure 1E:
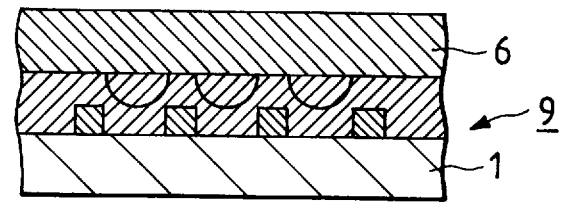

A protective layer 6 is further formed if needed (FIG. 1E). As the protective layer, may be used a resin material capable of setting by light irradiation or a heat treatment, or an inorganic film formed by vacuum deposition or sputtering. Any material may be used so far as it has sufficient transparency to be used in a color filter and withstands subsequent ITO-forming process, orientation film-forming process and the like.

The color filter 9 according to the present invention is thus completed.

Figure 4:
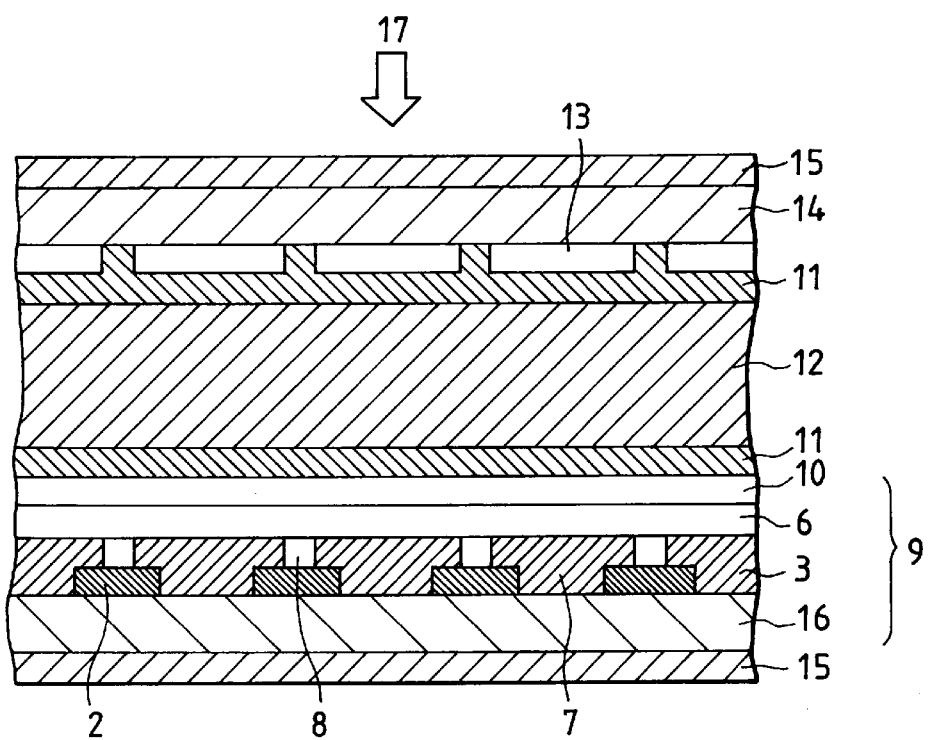
FIG. 4 is a partial cross-sectional view illustrating an exemplary construction of a color panel.

FIG. 4 illustrates a cross-sectional view of a TFT color liquid crystal display panel in which the color filter according to the present invention has been mounted.

The color liquid crystal display panel is formed by uniting the color filter 9 and a base 14 opposite to the color filter 9 and charging a liquid crystal composition 12 in a space between them. TFT (not illustrated) and transparent pixel electrodes 13 are formed in the form of a matrix inside the base 14 of the liquid crystal display panel. The color filter 9 is arranged at a position opposite to the pixel electrodes 13 inside the other base 16. A transparent counter (or common) electrode 10 is formed over on the color filter 9. Orientation films 13 are further formed within the surfaces of both bases. Liquid crystal molecules can be oriented in a fixed direction by subjecting these films to a rubbing treatment. Polarizing plates 15 are bonded to the outer surfaces of both glass bases. The liquid crystal compound is charged in a space (about 2 to 5 μm) between these glass bases. As a back light 17, a combination of a fluorescent lamp and a scattering plate (both, not shown) is used. The liquid crystal compound functions as a shutter for changing the transmittance of rays from the back light 17, thereby making a display. Reference numerals 3 and 6 designate an ink-receiving layer and a protective layer, respectively. Reference numerals 2, 7 and 8 are black matrices, colored portions and uncolored portions, respectively.

FIGS. 5A to 5F illustrate another embodiment of the production process according to the present invention.

Figure 5A:
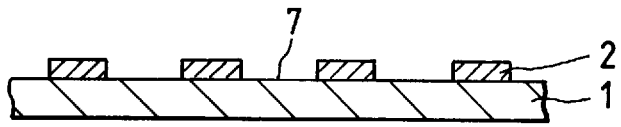
FIGS. 5A through 5F illustrate a production process of a color filter according to another embodiment of the present invention.
Figure 5B:
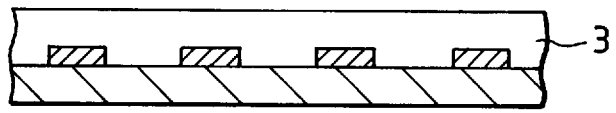

As illustrated in FIG. 5A, a composition having a water-based ink absorptivity, said ink absorptivity being lowered at its light-exposed portions by light irradiation or light irradiation and a heat treatment, is applied on a base 1, on which the black matrices 2 have been formed, and is prebaked, if needed, to form an ink-receiving layer 3 the ink absorptivity of which is lowered at its light-exposed portions by light irradiation or light irradiation and a heat treatment (FIG. 5B).

Figure 5C:
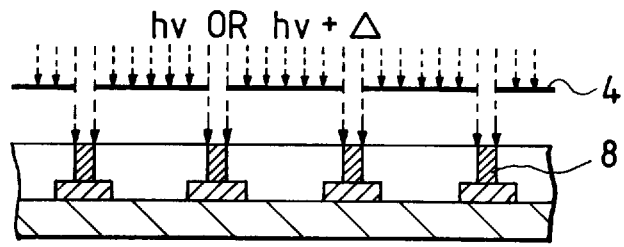
Figure 5D:
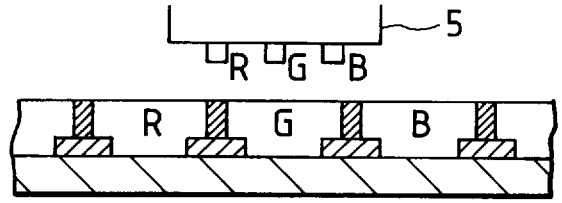
Figure 5E:
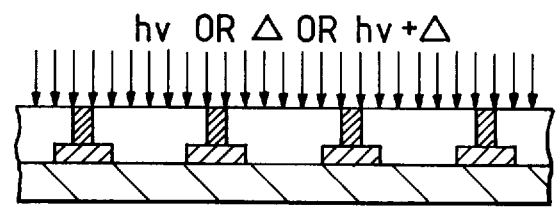
Figure 5F:
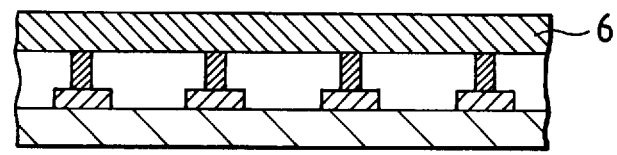

The ink-receiving layer 3 is then subjected to patterning exposure at portions of the black matrices 2, which are light-screening areas, using a photomask 4, to lower the ink absorptivity of the ink-receiving layer 3 at the light-exposed portions, thereby forming non-coloring portions 8 (FIG. 5C). Thereafter, unexposed portions of the ink-receiving layer are separately colored with R, G and B color inks using an ink-jet head 5 (FIG. 5D). The inks applied are dried as needed. The light-exposed portions, uncolored portions 8, have a function as a wall for preventing color mixing.

In view of the need of coloring wider areas than apertures defined by the black matrices to prevent an occurrence of blank area of the color filter, it is preferable to use a mask 4 having openings narrower than the light-screening width of the black matrix.

The colored composition layer thus colored is then subjected to irradiation and/or a heat treatment to set it (FIG. 5E), and a protective layer 6 is formed on the colored composition layer if needed (FIG. 5F), thereby obtaining a color filter. As the protective layer, may be used a resin material of the photo-setting type, thermosetting type or light- and heat-setting type, or an inorganic film formed by vacuum deposition, sputtering or the like. Any material may be used so far as it has sufficient transparency to be used in a color filter and withstands subsequent ITO-forming process, orientation film-forming process and the like.

FIGS. 6A to 6F illustrate a production process of a color filter used in a liquid crystal display panel in which black matrices are provided on a base opposite to a color filter base.

A process in which the black matrices are provided on the opposite base, not on the side of the color filter, is useful as a method of improving aperture efficiency.

Figure 6A:
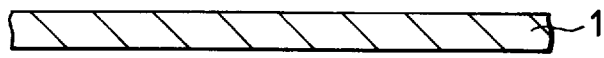
FIGS. 6A through 6F illustrate a production process of a color filter according to a further embodiment of the present invention.
Figure 6B:
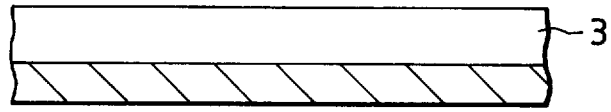

A composition, the ink absorptivity of which is lowered at its light-exposed portions by light irradiation or light irradiation and a heat treatment, is applied on a glass base 1 illustrated in FIG. 6A, and is prebaked, if needed, to form an ink-receiving layer 3 the ink absorptivity of which is lowered at its light-exposed portions by light irradiation or light irradiation and a heat treatment (FIG. 6B).

Figure 6C:
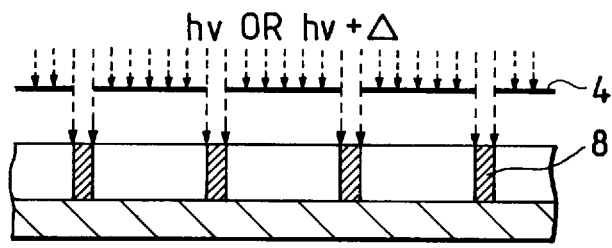
Figure 6D:
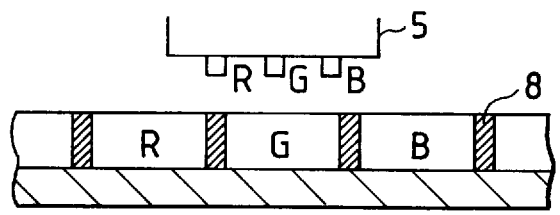
Figure 6E:
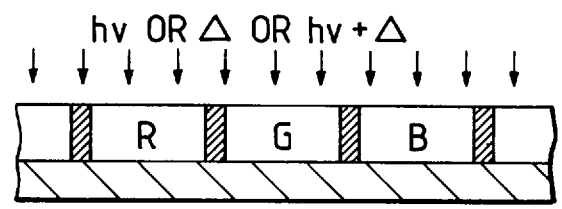
Figure 6F:
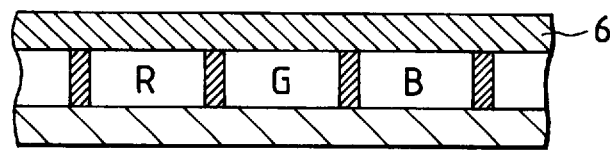

Patterning exposure is then conducted using a photomask 4, thereby lowering the ink absorptivity of the ink-receiving layer 3 at the light-exposed portions (FIG. 6C). Thereafter, the unexposed portions of the ink-receiving layer are colored with individual color inks of R, G and B using an ink-jet head 5 (FIG. 6D). The inks applied are dried if needed. In order to prevent an occurrence of blank area, it is important to make the width of each uncolored portion 8 narrower than that of the black matrix (not shown) provided on the opposite base.

The colored composition layer thus colored is then subjected to light irradiation and/or a heat treatment to set it (FIG. 6E), and a protective layer 6 is formed on the composition layer if needed (FIG. 6F) to obtain a color filter. As the protective layer, may be used the same material as that described above as to FIG. 5F.

An embodiment in which the above-described liquid crystal display panel is applied to an information processor will be described by reference to FIGS. 7 through 9.

Figure 7:
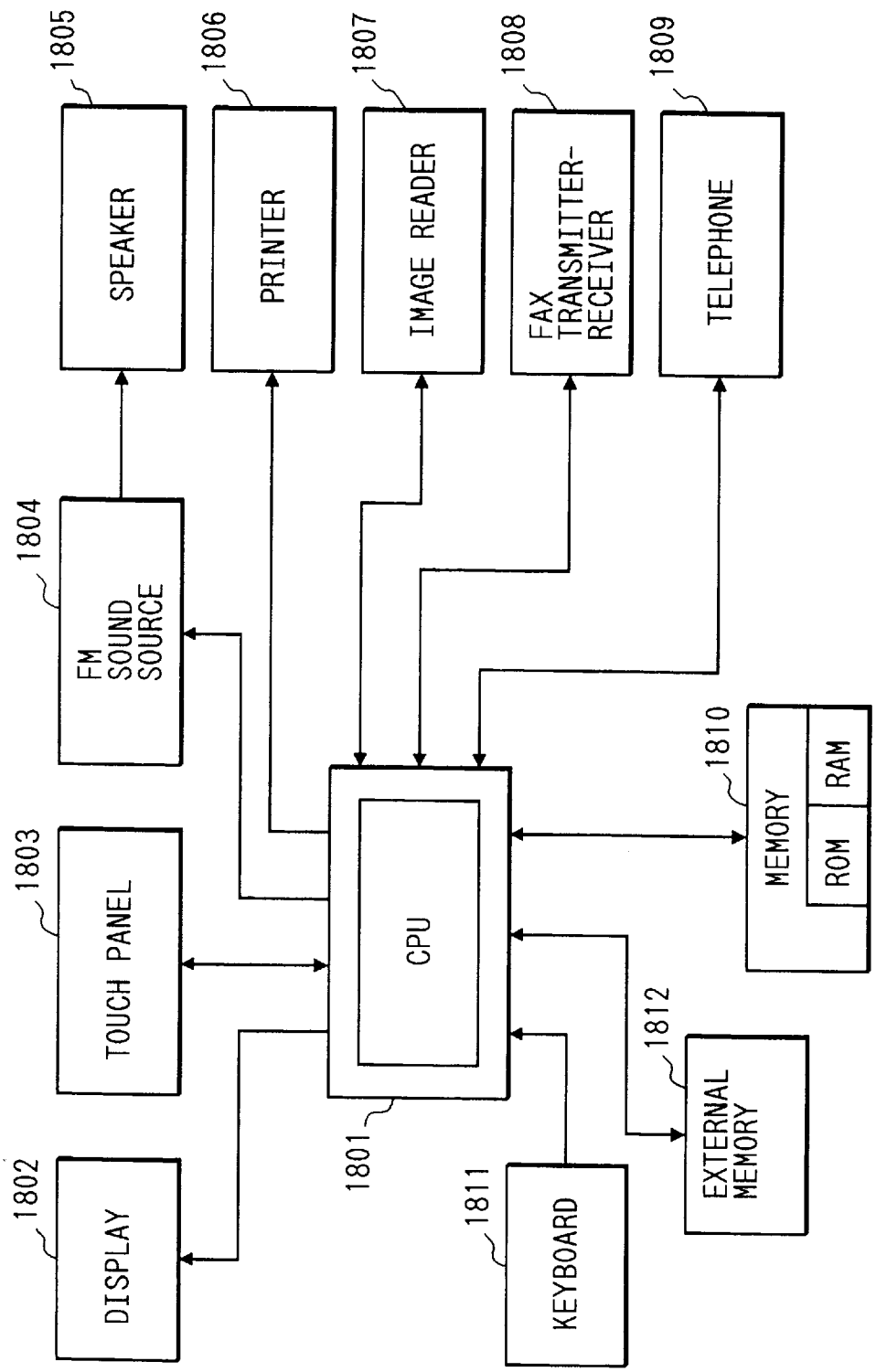
FIG. 7 is a block diagram illustrating a construction in which a liquid crystal display panel according to the present invention is applied to an information processor.

FIG. 7 is a block diagram illustrating a schematic construction of a case where the liquid crystal display panel is applied to an information processor having functions as a word processor, personal computer, facsimile terminal equipment and copying machine.

In FIG. 7, reference numeral 1801 designates a control section serving to control the whole apparatus. The control section 1801 is equipped with a CPU such as a microprocessor, and various I/O ports, and outputs control signals, data signals and the like into individual units and inputs control signals and data signals from the individual units, thereby making control. Reference numeral 1802 indicates a display section. Various menus, document information, image data read by an image reader 1807, etc. are displayed on its display screen. Reference numeral 1803 designates a transparent touch panel of the pressure sensing type, which is provided over the display 1802. Item input, coordinate position input and the like can be performed on the display 1802 by pressing the surface of the touch panel 1803 with fingers or the like.

Reference numeral 1804 indicates an FM (frequency modulation) sound source section in which music information prepared by a music editor or the like is stored as digital data in a memory section 1810 and an external memory 1812 and read from these memories to conduct FM modulation. Electric signals from the FM sound source section 1804 are converted into audio sounds by a speaker section 1805. A printer section 1806 is used as an output terminal for a word processor, personal computer, facsimile terminal equipment and copying machine.

Reference numeral 1807 indicates an image reader section serving to photoelectrically read original data and to input them. The image reader section 1807 is provided in the course of the conveyance of an original and serves to read facsimile information, copied materials and other various original documents.

Reference numeral 1808 designates a transmitter-receiver section of the facsimile (FAX), which effects facsimile transmission of the original document data read by the image reader 1807 and receives facsimile signals sent to decode them. The transmitter-receiver has a function of external interface. Reference numeral 1809 designates a telephone section having various telephone functions such as an ordinary telephone function and an automatic telephone answering function.

Reference numeral 1810 indicates the memory section containing application programs such as a system program and a manager program, a ROM, which stores character fonts, a dictionary, etc., application programs and document information loaded from the external memory 1812, a video RAM, etc.

Reference numeral 1811 designates a keyboard section serving to input document information, various commands and the like.

Reference numeral 1812 designates the external memory which uses, as storage media, floppy disks and hard disks. In this external memory 1812, document information, music or audio information, application programs for users, etc. are stored.

Figure 8:
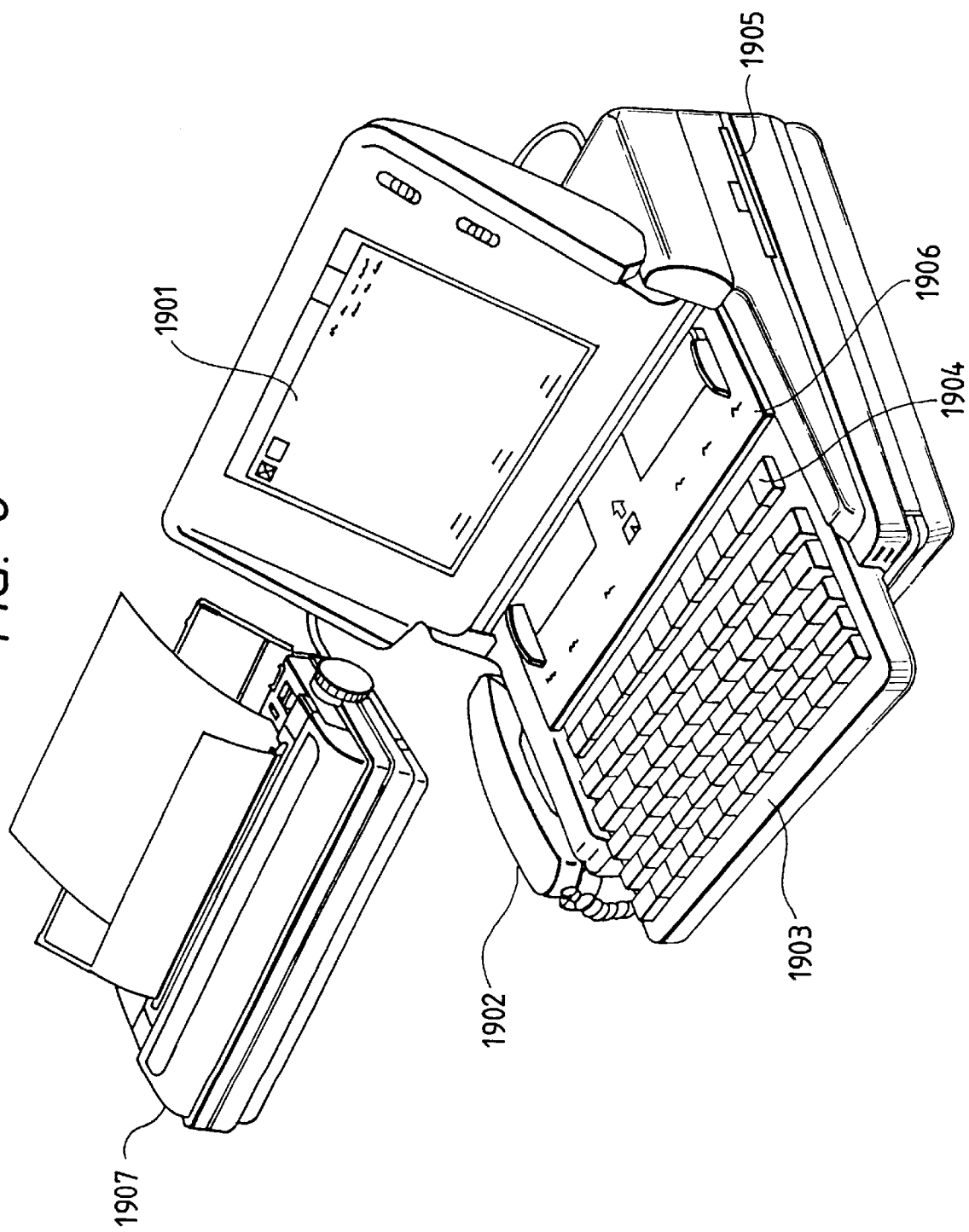
FIG. 8 is a typical bird's-eye view of the information processor of FIG. 7.

FIG. 8 is a typical bird's-eye view of the information processor of FIG. 7.

In FIG. 8, reference numeral 1901 indicates a flat panel display making good use of the above-described liquid crystal display panel and serving to display various menus, graphic information, document information and the like. Coordinate input, item-specifying input and the like can be performed by pressing the surface of the touch panel 1803 over the display 1901 with fingers or the like. Reference numeral 1902 designates a hand set used at the time the processor functions as a telephone. A keyboard 1903 is detachably connected to a main body through a code and serves to effect input of various document functions and various data. Various function keys 1904 and the like are provided in this keyboard 1903. Reference numeral 1905 indicates an insertion opening for a floppy disk into the external memory 1812.

Reference numeral 1906 designates a paper plate on which an original document to be read by the image reader section 1807 is placed. The original document read is discharged from the rear of the processor. Facsimile information or the like received is printed by an ink-jet printer 1907.

When the information processor functions as a personal computer or word processor, various kinds of information inputted from the keyboard section 1811 are processed in the control section 1801 in accordance with the predetermined program and outputted as images to the printer section 1806.

When the information processor functions as a receiver for a facsimile terminal equipment, facsimile information inputted from the transmitter-receiver section 1808 of the FAX through a telecommunication line is processed for receiving in the control section 1801 in accordance with the predetermined program and outputted as received images to the printer section 1806.

When the information processor functions as a copying machine, an original document is read by the image reader section 1807, and the thus-read original document data are outputted as copy images to the printer section 1806 through the control section 1801. When the information processor functions as a transmitter for a facsimile terminal equipment, original data read by the image reader section 1807 is processed for transmission in the control section 1801 in accordance with the predetermined program and then transmitted to a telecommunication line through the transmitter-receiver section 1808 of the FAX.

Figure 9:
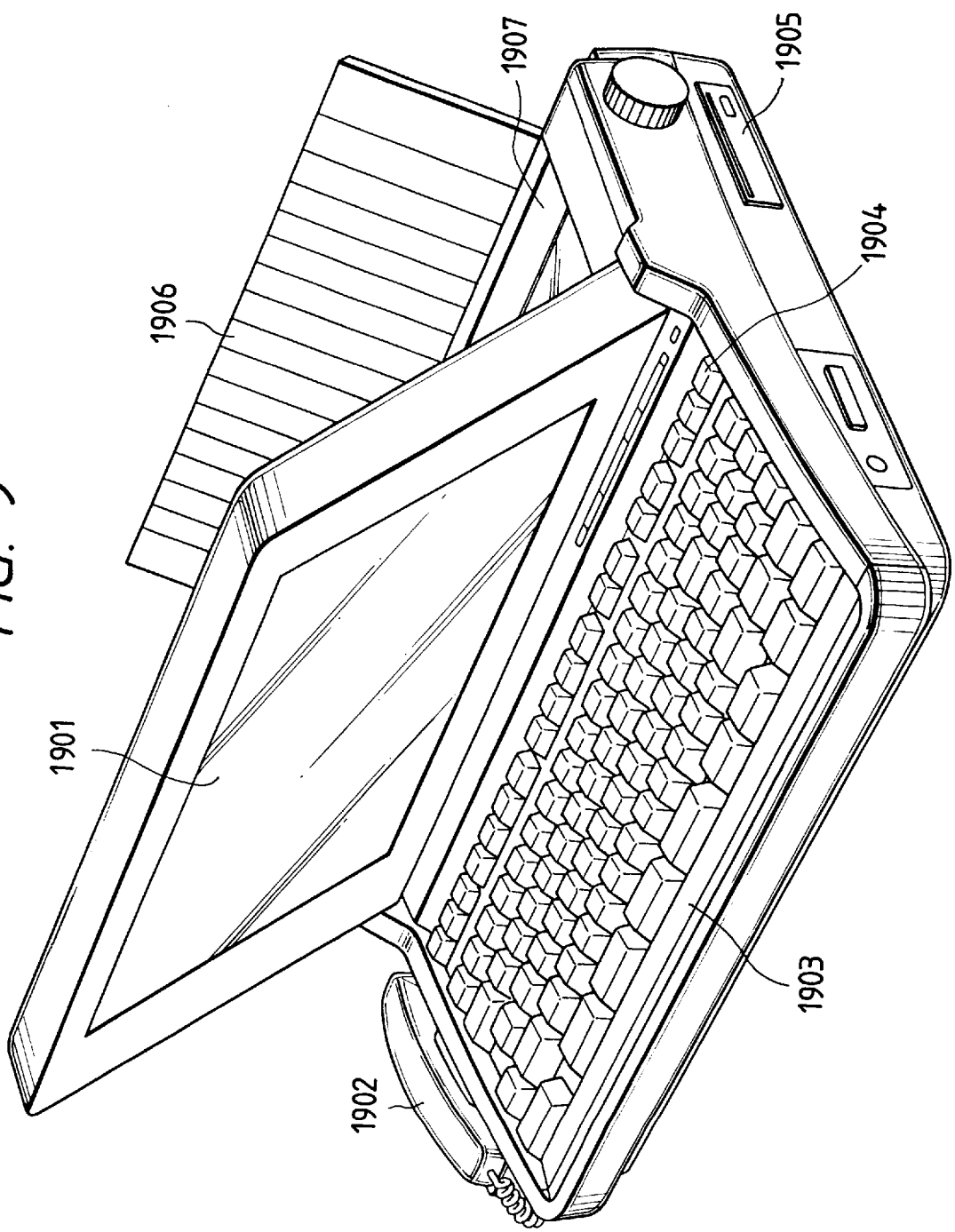
FIG. 9 is a typical drawing illustrating an exemplary information processor.

The information processor may be an integrated apparatus in which an ink-jet printer is built in the main body as illustrated in FIG. 9. In this case, portability may be more enhanced. In FIG. 9, like reference numerals are given to parts having the same function as those in FIG. 8.

Figure 10:
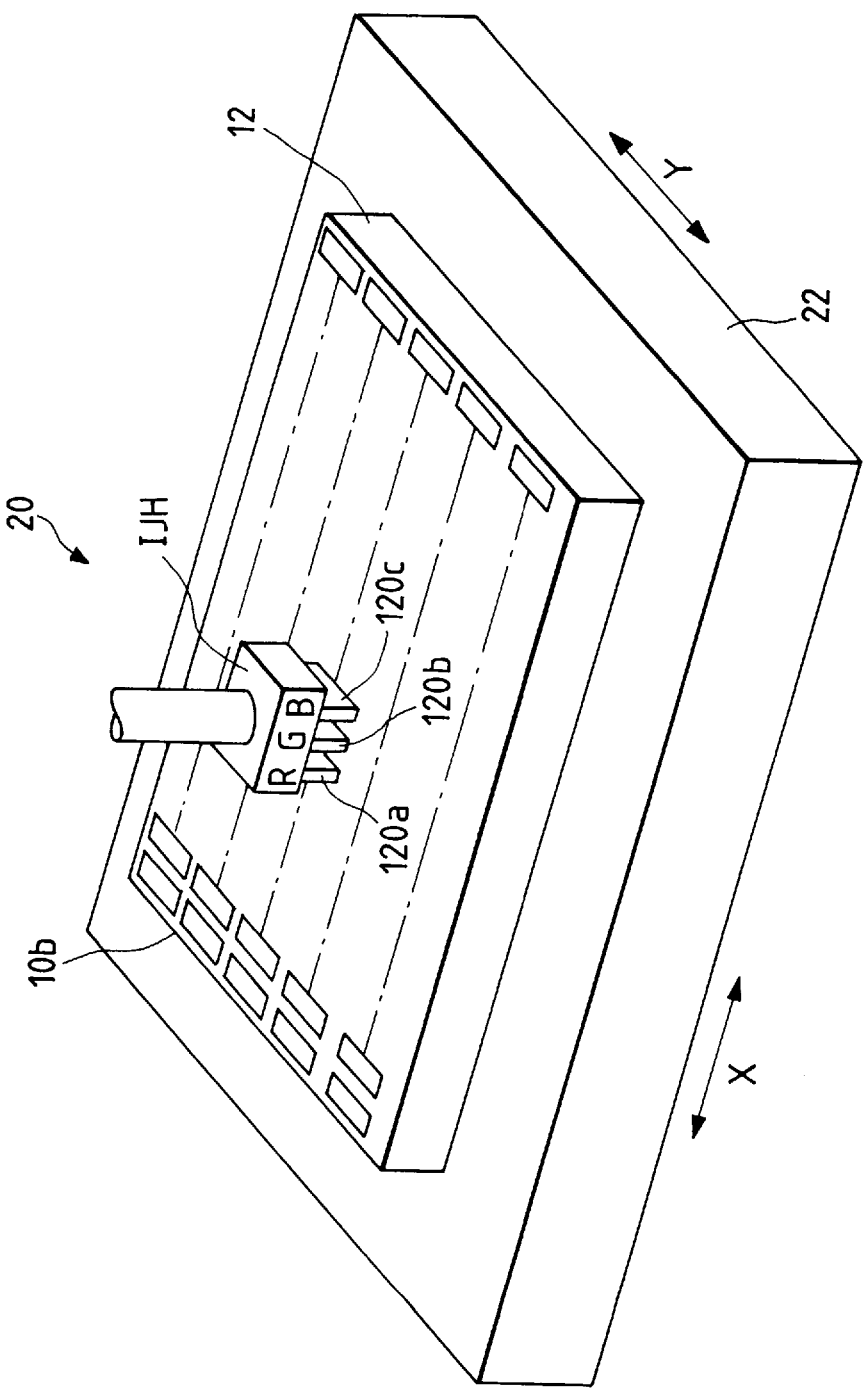
FIG. 10 illustrates a construction of a production apparatus for producing a color filter.

FIG. 10 illustrates a construction of a production apparatus for producing the color filter shown in FIG. 1.

In FIG. 10, the production apparatus 20 is placed on a frame not illustrated and is equipped with an XY table 22 movable in X and Y directions in the drawing and an ink-jet head IJH fixed to the frame via a support member (not illustrated) over the XY table 22. On the XY table 22, is placed a glass base 12 on which light-screening lattices (black matrices) 10*b* and portions to be colored have been formed. The ink-jet head IJH is equipped with a head 120*a* for red ink, which ejects a red ink, a head 120*b* for green ink, which ejects a green ink, and a head 120*c* for blue ink, which ejects a blue ink. These heads 120*a*, 120*b* and 120*c* are constructed so as to be able to independently eject their corresponding inks.

In the production apparatus 20 thus constructed, an ink of R, G or B color is ejected within the frame of the desired light-screening lattice 10*b* on the glass base 12 while the XY table 22 is moved in the XY directions to the ink-jet head IJH, thereby coloring the glass base within the individual frames of the light-screening lattices 10*b* to complete a color filter.

Figure 11:
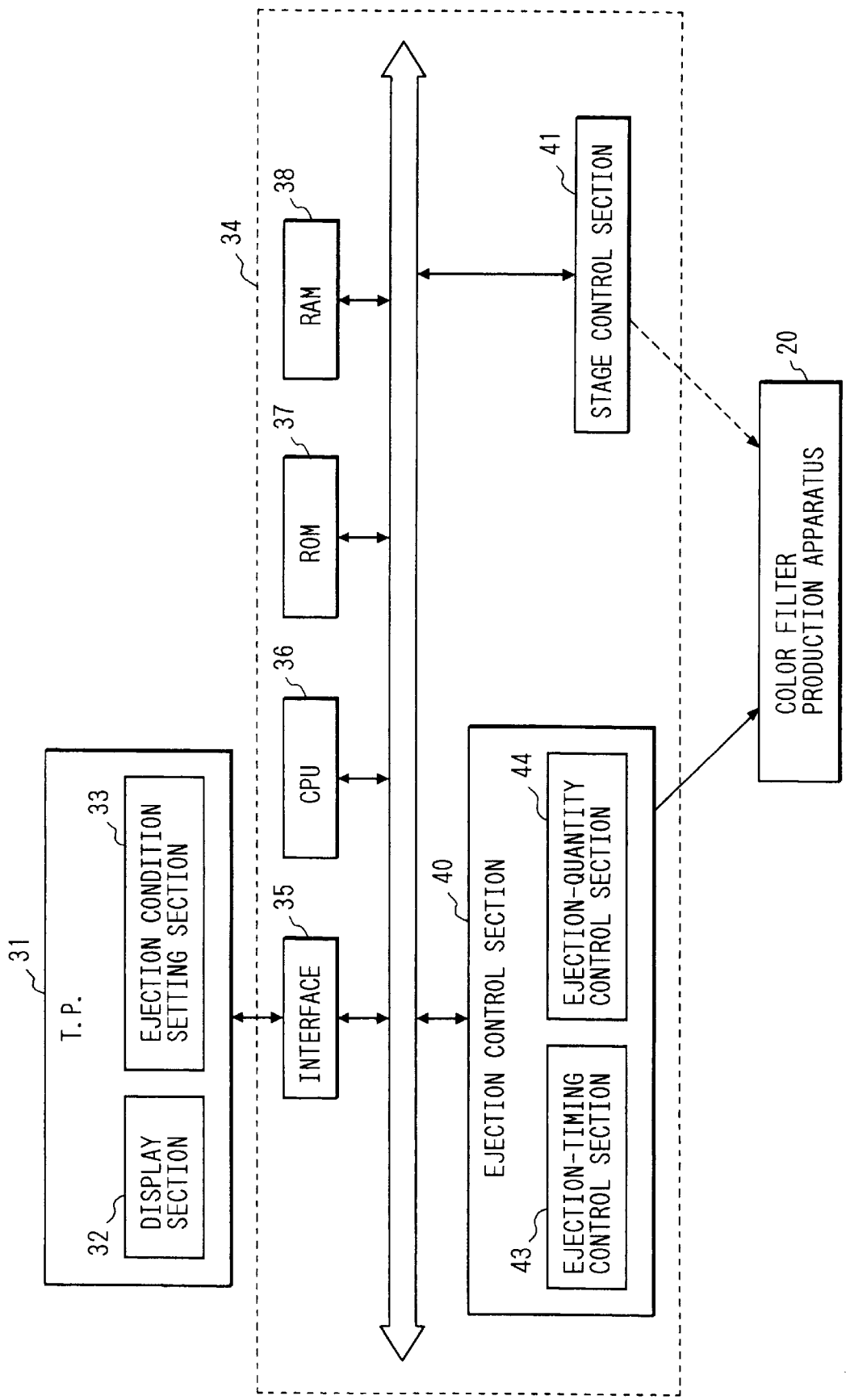
FIG. 11 is a block diagram illustrating a construction of a production controller in the production apparatus of FIG. 10.

FIG. 11 is a block diagram illustrating a construction of a production controller in the production apparatus 20 of FIG. 10.

In FIG. 11, reference numeral 31 designates a teaching pendant which is an input-output means of the production controller, 32 a display section which displays results of ejection information and the like, and 33 a setting section in which ejection conditions such as an ejection pattern are set, respectively.

Reference numeral 34 indicates a controller which controls the production apparatus 20 for the color filter, 35 an interface serving to transfer data to the teaching pendant 31, 36 a CPU serving to conduct the stage control and operation of track planning of the production apparatus 20, 37 a ROM which stores a control program for operating the CPU, 38 a RAM which stores data such as ejection conditions, and 40 an ejection control section serving to control the ejection patterns of colorants, which is a particularly important part in this embodiment. The ejection control section is constructed by an ejection-timing control section 43 which controls the ejection-starting position, ejection interval and ejection number in a filter element, and an ejection-quantity control section 44 which controls the size of a dot in the filter element. Reference numeral 41 designates a control section for the stage 22 of the production apparatus 20. Reference numeral 20 indicates the production apparatus which is connected to the controller 34 and operates on the instruction thereof.

The present invention will hereinafter be described more specifically by the following Examples. However, the present invention is not limited to these examples only. Incidentally, all designations of "%" as to composition as will be used in the following examples mean % by weight unless expressly noted.

EXAMPLES A1 TO A8

A settable resin composition composed of N-methylolacrylamide and hydroxyethyl methacrylate (molar ratio=1:1) was applied as an ink-receiving layer by spin coating onto glass bases equipped with black matrices having an aperture of 60 to 150 $\mu$m in size so as to give a coating thickness of 1.2 $\mu$m, and prebaked at 120° C. for 20 minutes. Using an ink-jet printer, the ink-receiving layer was then colored with the corresponding R, B and G inks described below in matrix patterns of R, B and G colors. The colored portions thus formed were then baked at 230° C. for 50 minutes, thereby advancing a curing reaction. After drying, a two-pack type thermosetting resin material (trade name: SS-7625, product of Japan Synthetic Rubber Co., Ltd.) was further applied by spin coating onto the layer of the resin composition so as to give a coating thickness of 1 $\mu$m. The thus-formed film was heat-treated at 240° C. for 20 minutes to set it, thereby producing color filters for liquid crystal display device.

Dye for the R ink

C.I. Acid Red 158.

Dye for the G ink

G-1: a dye obtained by toning C.I. Direct Blue 86 with C.I. Acid Yellow 23, mixing ratio=3:7;

G-2: a dye obtained by toning C.I. Direct Blue 86 with C.I. Direct Yellow 86, mixing ratio=4:6;

G-3: a dye obtained by toning C.I. Direct Blue 86 with C.I. Direct Yellow 142, mixing ratio=3:7;

G-4: a dye obtained by toning C.I. Direct Blue 87 with C.I. Direct Yellow 142, mixing ratio=3:7;

G-5: a dye obtained by toning C.I. Direct Blue 87 with C.I. Acid Yellow 23, mixing ratio=5:5;

G-6: a dye obtained by toning C.I. Direct Blue 199 with C.I. Acid Yellow 23, mixing ratio=2:8;

G-7: a dye obtained by toning C.I. Direct Blue 199 with C.I. Direct Yellow 86, mixing ratio=3:7;

G-8: a dye obtained by toning C.I. Direct Blue 199 with C.I. Direct Yellow 142, mixing ratio=4:6.

Dye for the B ink

B-1: a dye obtained by toning C.I. Direct Blue 86 with C.I. Acid Red 289, mixing ratio=9:1;

B-2: a dye obtained by toning C.I. Direct Blue 86 with C.I. Acid Red 319, mixing ratio=8.5:1.5;

B-3: a dye obtained by toning C.I. Direct Blue 86 with C.I. Acid Violet 9, mixing ratio=9:1;

B-4: a dye obtained by toning C.I. Direct Blue 87 with C.I. Acid Violet 9, mixing ratio=9.5:0.5;

B-5: a dye obtained by toning C.I. Direct Blue 87 with C.I. Acid Red 145, mixing ratio=9:1;

B-6: a dye obtained by toning C.I. Direct Blue 199 with C.I. Acid Red 157, mixing ratio=8:2;

B-7: a dye obtained by toning C.I. Direct Blue 199 with C.I. Acid Violet 51, mixing ratio=9:1;

B-8: a dye obtained by toning C.I. Direct Blue 199 with C.I. Acid Red 289, mixing ratio=9.5:0.5.

| Ink formulation 1: | |
|---|---|
| Dye | 4.8% |
| N,N-Dimethylacetamide (bp: 166.1° C.) | 35.0% |
| Isopropyl alcohol (bp: 82° C.) | 5.0% |
| Water | 55.2%. |

Evaluation methods

Evaluation 1 Transparency of colored portions

Each of the above-produced color filters was used to fabricate a liquid crystal display panel, thereby visually evaluating the color filter as to transparency by classifying it into the following three ranks:

A: Good in transparency;

B: Somewhat poor in transparency; and

C: Duller than that ranked as A or B.

Evaluation 2 Precision of impact position

Each of the above-described inks of G or B color was filled in an ink-jet printer in which a recording head having a nozzle density of 360 dpi (nozzle pitch: 70.4 m) and 64 nozzles was mounted. All the nozzles were driven at the same time to print a linear line formed of 64 dots. This operation was repeated 200 times at an interval of 0.5 second, thereby evaluating the ink as to precision of impact position to rank it in terms of percent of the number of dots deviated at a distance of at least one dot from the linear line in accordance with the following standard:

A: Lower than 0.1%;

B: Not lower than 0.1% but lower than 0.5%; and

C: Not lower than 0.5%.

Evaluation 3 Light fastness

Using an Atlas fade-o-meter Ci35, light from a xenon lamp was exposed to each of the above-described color filters for 50 hours, thereby calculating the magnitude of change in color at colored patterns of G and B colors as $\Delta E$ prescribed by CIE to evaluate the color filter as to light fastness so as to rank it in accordance with the following standard:

A: $\Delta E$ not greater than 10;

B: $\Delta E$ greater than 10 but not greater than 20; and

C: $\Delta E$ greater than 20.

Evaluation 4 Bleeding at colored portions

Each of the above color filters was left over for 48 hours at 60° C., thereby evaluating the filter as to the degree (increase in the area of the colored portion) of bleeding at the colored patterns of G and B to rank it in terms of percent increase in the area of the colored portions in accordance with the following standard:

A: lower than 5%;

B: Not lower than 5% but Lower than 10%; and

C: Not lower than 10%.

The evaluation results are shown in Tables 5 and 6.

COMPARATIVE EXAMPLES A1 AND A2

Color filters of Comparative Examples A1 and A2 were produced under the same conditions as in Example A1 except that dyes shown in Table 4 were respectively used in place of the G and B dyes in Example A1, thereby performing the same evaluation as in Examples A1 to A8. The evaluation results are shown in Tables 5 and 6.

TABLE 4

| | Dye for the G ink | Dye for the B ink |
|---|---|---|
| Comp. Ex. A1 | C.I. Acid Green 9 | C.I. Acid Blue 83 |
| Comp. Ex. A2 | C.I. Direct Green 8 | C.I. Direct Blue 237 |

TABLE 5

| | Exemplified dye No. | Transparency | Precision impact position | Light fastness | Bleeding |
|---|---|---|---|---|---|
| Ex. A1 | G-1 | A | B | A | A |
| Ex. A2 | G-2 | A | A | A | A |
| Ex. A3 | G-3 | A | A | A | A |
| Ex. A4 | G-4 | A | A | A | A |
| Ex. A5 | G-5 | A | B | A | A |
| Ex. A6 | G-6 | A | B | A | A |
| Ex. A7 | G-7 | A | A | A | A |
| Ex. A8 | G-8 | A | A | A | A |
| Comp. Ex. A1 | C.I. Acid Green 9 | B | B | C | C |
| Comp. Ex. A2 | C.I. Direct Green 8 | C | B | B | B |

TABLE 6

|  | Exemplified dye No. | Transparency | Precision impact position | Light fastness | Bleeding |
|---|---|---|---|---|---|
| Ex. A1 | B-1 | A | A | A | A |
| Ex. A2 | B-2 | A. | A | A | A |
| Ex. A3 | B-3 | A | B | A | A |
| Ex. A4 | B-4 | A | A | A | A |
| Ex. A5 | B-5 | A | B | A | A |
| Ex. A6 | B-6 | A | A | A | A |
| Ex. A7 | B-7 | A | A | A | A |
| Ex. A8 | B-8 | A | B | A | A |
| Comp. Ex. A1 | C.I. Acid Blue 83 | B | B | C | C |
| Comp. Ex. A2 | C.I. Direct Blue 237 | C | C | B | C |

EXAMPLES B1 TO B8 AND COMPARATIVE EXAMPLES B1 AND B2

Color filters for liquid crystal display device according to Examples B1 to B8 and Comparative Examples B1 and B2 were produced in the same conditions as in Examples A1 to A8 except that the ink formulation 1 in Examples A1 to A8 was changed to the following ink formulation 2. Such inks and the color filters thus produced were used to perform the same evaluation as described above.

Ink formulation 2:

| Dye | 4.5% |
|---|---|
| Diethylene glycol monomethyl ether (bp: 194.1° C.) | 30.0% |
| 1,3-Butanediol (bp: 207.5° C.) | 5.0% |
| Isopropyl alcohol (bp: 82° C.) | 3.0% |
| Water | 57.5%. |

The evaluation results are shown in Tables 7 and 8.

TABLE 7

|  | Exemplified dye No. | Transparency | Precision impact position | Light fastness | Bleeding |
|---|---|---|---|---|---|
| Ex. B1 | G-1 | A | A | A | A |
| Ex. B2 | G-2 | A | A | A | A |
| Ex. B3 | G-3 | A | A | A | A |
| Ex. B4 | G-4 | A | A | A | A |
| Ex. B5 | G-5 | A | A | A | A |
| Ex. B6 | G-6 | A | A | A | A |
| Ex. B7 | G-7 | A | A | A | A |
| Ex. B8 | G-8 | A | A | A | A |
| Comp. Ex. B1 | C.I. Acid Green 9 | B | B | C | B |
| Comp. Ex. B2 | C.I. Direct Green 8 | C | B | B | B |

TABLE 8

|  | Exemplified dye No. | Transparency | Precision impact position | Light fastness | Bleeding |
|---|---|---|---|---|---|
| Ex. B1 | B-1 | A | A | A | A |
| Ex. B2 | B-2 | A | A | A | A |
| Ex. B3 | B-3 | A | A | A | A |
| Ex. B4 | B-4 | A | A | A | A |
| Ex. B5 | B-5 | A | A | A | A |
| Ex. B6 | B-6 | A | A | A | A |
| Ex. B7 | B-7 | A | A | A | A |
| Ex. B8 | B-8 | A | A | A | A |
| Comp. Ex. B1 | C.I. Acid Blue 83 | B | B | C | B |
| Comp. Ex. B2 | C.I. Direct Blue 237 | C | B | B | C |

EXAMPLES C1 TO C8 AND COMPARATIVE EXAMPLES C1 AND C2

Color filters for liquid crystal display device according to Examples C1 to C8 and Comparative Examples C1 and C2 were produced in the same conditions as in Examples A1 to A8 except that the ink formulation 1 in Examples A1 to A8 was changed to the following ink formulation 3. Such inks and the color filters thus produced were used to perform the same evaluation as described above.

Ink formulation 3:

| Dye | 5.0% |
|---|---|
| Diethylene glycol (bp: 245° C.) | 35.0% |
| 2-Pyrrolidone (bp: 245° C.) | 10.0% |
| Water | 50.0%. |

The evaluation results are shown in Tables 9 and 10.

TABLE 9

|  | Exemplified dye No. | Transparency | Precision impact position | Light fastness | Bleeding |
|---|---|---|---|---|---|
| Ex. C1 | G-1 | A | B | B | A |
| Ex. C2 | G-2 | B | B | B | B |
| Ex. C3 | G-3 | A | A | A | A |
| Ex. C4 | G-4 | B | A | B | A |
| Ex. C5 | G-5 | B | B | A | B |
| Ex. C6 | G-6 | A | A | A | A |
| Ex. C7 | G-7 | A | B | A | B |
| Ex. C8 | G-8 | B | A | A | B |
| Comp. Ex. C1 | C.I. Acid Green 9 | C | B | C | C |
| Comp. Ex. C2 | C.I. Direct Green 8 | B | C | C | B |

TABLE 10

|  | Exemplified dye No. | Transparency | Precision impact position | Light fastness | Bleeding |
|---|---|---|---|---|---|
| Ex. C1 | B-1 | A | A | A | A |
| Ex. C2 | B-2 | A | B | B | B |
| Ex. C3 | B-3 | B | B | A | A |
| Ex. C4 | B-4 | A | A | B | A |
| Ex. C5 | B-5 | B | B | A | A |
| Ex. C6 | B-6 | A | A | B | B |
| Ex. C7 | B-7 | B | A | B | B |
| Ex. C8 | B-8 | A | B | A | A |
| Comp. Ex. C1 | C.I. Acid Blue 83 | B | B | C | C |
| Comp. Ex. C2 | C.I. Direct Blue 237 | C | B | B | C |

EXAMPLES D1 TO D8 AND COMPARATIVE EXAMPLES D1 AND D2

Color filters for liquid crystal display device according to Examples D1 to D8 and Comparative Examples D1 and D2 were produced in the same conditions as in Examples B1 to B8 except that an ink-receiving layer formed of hydroxypropylcellulose (trade name: HPC-H, product of Nippon Soda Co., Ltd.) and methylolmelamine (trade name: Sumitex M-3, product of Sumitomo Chemical Co., Ltd.) was used in place of the ink-receiving layer in Examples B1 to B8. The inks and the color filters thus produced were used to perform the same evaluation as described above. The evaluation results are shown in Tables 11 and 12.

TABLE 11

| | Exemplified dye No. | Transparency | Precision impact position | Light fastness | Bleeding |
|---|---|---|---|---|---|
| Ex. D1 | G-1 | A | A | B | A |
| Ex. D2 | G-2 | B | A | A | B |
| Ex. D3 | G-3 | A | A | A | B |
| Ex. D4 | G-4 | A | A | A | A |
| Ex. D5 | G-5 | A | A | B | B |
| Ex. D6 | G-6 | B | A | B | A |
| Ex. D7 | G-7 | A | A | A | A |
| Ex. D8 | G-8 | B | A | A | B |
| Comp. Ex. D1 | C.I. Acid Green 9 | C | B | C | C |
| Comp. Ex. D2 | C.I. Direct Green 8 | C | C | C | C |

TABLE 12

| | Exemplified dye No. | Transparency | Precision impact position | Light fastness | Bleeding |
|---|---|---|---|---|---|
| Ex. D1 | B-1 | A | A | A | B |
| Ex. D2 | B-2 | B | A | B | A |
| Ex. D3 | B-3 | B | A | A | A |
| Ex. D4 | B-4 | A | A | A | A |
| Ex. D5 | B-5 | B | A | A | A |
| Ex. D6 | B-6 | A | A | B | B |
| Ex. D7 | B-7 | B | A | B | B |
| Ex. D8 | B-8 | A | A | A | A |
| Comp. Ex. D1 | C.I. Acid Blue 83 | B | B | C | C |
| Comp. Ex. D2 | C.I. Direct Blue 237 | C | B | C | C |

Example E

Onto a glass base 1 on which black matrices 2 had been formed as illustrated in FIG. 5A, a photosettable composition comprised of 10 parts by weight of a three-component copolymer composed of N-methylolacrylamide, methyl methacrylate and hydroxyethyl methacrylate and 0.5 part by weight of a halogenated triazine compound (TAZ-101, product of Midori Kagaku K.K.) was applied by spin coating so as to give a coating thickness of 1 μm, and prebaked at 50° C. for 10 minutes, thereby forming an ink-receiving layer 3 capable of setting by light.

Portions of the ink-receiving layer 3 on the black matrices 2 were then subjected to a patterning exposure through a photomask having openings narrower than the width of the black matrix 2 and then set.

Using an ink-jet printer, the ink-receiving layer was then colored with the same R, B and G inks as those used in Example A or B in matrix patterns of R, B and G. The inks thus applied were then dried at 90° C. for 5 minutes. The whole surface of the ink-receiving layer 3 was subsequently subjected to exposure to set it.

A photo-setting resin composition composed of an epoxy-acrylate and a photo-induced initiator was further applied by spin coating onto the colored ink-receiving layer 3 so as to give a coating thickness of 1 μm, and prebaked at 90° C. for 30 minutes, thereby forming a protective layer 6. The thus-formed protective layer 6 was then wholly exposed to set it, thereby producing a color filter.

The color filter thus obtained had the same properties as those in Examples A and B.

According to the present invention, color panels can be simply produced by an ink-jet system by containing the above-described dyes in the inks. Namely, the inks containing the dye according to the present invention become high in the precision of ink-droplet impact and satisfy all the requirements as to the transparency, bleeding and light fastness of the resulting pixels.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for producing a color filter, arranged with a plurality of colored pixels on a base, by applying inks of red, blue and green colors onto the base with an ink-jet printing system, wherein the blue ink comprises a dye of C.I. Direct Blue 199 and a dye selected from the group consisting of red, magenta and violet colors in combination.

2. The process according to claim 1, wherein the dye of a red, magenta or violet color is selected from the group consisting of C.I. Acid Red 145, 157, 289 and 319, and C.I. Acid Violet 9 and 51.

3. The process according to claim 1, wherein the concentration of the dyes in the blue ink is from 0.1 to 15% by weight.

4. The process according to claim 1, wherein the blue ink contains from 5 to 50% by weight of a solvent having a boiling point of from 150° to 250° C.

5. The process according to claim 1, wherein the colored pixels are arranged in a resin layer provided on an optically transparent base.

6. The process according to claim 5, wherein a material forming the resin layer comprises a water-soluble acrylic monomer unit.

7. The process according to claim 5, wherein a material forming the resin layer comprises a water-soluble cellulosic polymer.

8. The process according to claim 5, further comprising forming a protective layer on the resin layer having the colored pixels.

9. The process according to claim 8, wherein the protective layer comprises a resin composition capable of setting by light exposure and/or heating.

10. The process according to claim 8, wherein the protective layer comprises an inorganic layer formed by vacuum deposition or sputtering.

11. A color filter produced by the process according to any one of claims 1 to 10.

12. A process for producing a color filter by applying inks of red, blue and green colors to a base having light-screening areas and light-transmitting areas with an ink-jet printing system to arrange colorants on the base, which comprises the steps of:

(1) providing a resin layer which is capable of setting by light exposure, optionally followed by heating and is ink-receptive onto the base;

(2) subjecting a part of the resin layer on the light-screening areas to light exposure, optionally followed by heating;

(3) applying colorants to unexposed portions of the resin layer with the ink-jet printing system using a blue ink comprising a dye of C.I. Direct Blue 199 and a dye selected from the group consisting of red, magenta and violet colors in combination; and (4) setting the colored portions of the resin layer by light exposure, optionally followed by heating.

13. The process according to claim 12, wherein the width of the resin layer on the light-screening areas exposed in the step (2) is narrower than that of the light-screening area.

14. The process according to claim 12, further comprising forming a protective layer on the resin layer after step (4).

15. The process according to claim 14, wherein the protective layer comprises a resin composition capable of setting by light exposure and/or heating.

16. The process according to claim 14, wherein the protective layer comprises an inorganic layer formed by vacuum deposition or sputtering.

17. The process according to claim 12, wherein the dye of a red, magenta or violet color is selected from the group consisting of C.I. Acid Red 145, 157, 289 and 319, and C.I. Acid Violet 9 and 51.

18. The process according to claim 12, wherein the concentration of the dyes in the blue ink is from 0.1 to 15% by weight.

19. The process according to claim 12, wherein the blue ink contains from 5 to 50% by weight of a solvent having a boiling point of from 150° to 250° C.

20. The process according to claim 12, wherein a material forming the resin layer is a polymer containing at least water-soluble acrylic monomer units.

21. The process according to claim 12, wherein a material forming the resin layer comprises a water-soluble cellulosic polymer.

22. A color filter produced by the process according to any one of claims 12 to 21.

23. A color filter arranged with pixels colored in red, green and blue, wherein a portion colored in blue contains a dye of C.I. Direct Blue 199 and a dye selected from the group consisting of red, magenta and violet colors in combination.

24. The color filter according to claim 23, wherein the dye of a red, magenta or violet color is selected from the group consisting of C.I. Acid Red 145, 157, 289 and 319, and C.I. Acid Violet 9 and 51.

25. The color filter according to claim 23, wherein the pixels are arranged in a resin layer provided on an optically transparent base.

26. The color filter according to claim 25, wherein a material forming the resin layer is a polymer containing at least water-soluble acrylic monomer units.

27. The color filter according to claim 25, wherein a material forming the resin layer comprises a water-soluble cellulosic polymer.

28. The color filter according to claim 25, further comprising a protective layer provided on the resin layer having the colored pixels.

29. The color filter according to claim 28, wherein the protective layer comprises a resin composition.

30. The color filter according to claim 28, wherein the protective layer comprises an inorganic layer.

31. A liquid crystal display panel comprising the color filter according to any one of claims 23 to 30 a panel base provided in an opposing relation with the color filter and a liquid crystal composition enclosed in a space between the color filter and the panel base.

32. An information processor equipped with the liquid crystal display panel according to claim 31.

33. A color filter comprising a base having light-screening areas and light-transmitting areas, and a resin layer provided thereon and the resin layer having portions colored in red, blue and green and arranged with pixels colored in red, blue and green, wherein the resin layer on the light-screening areas has a colored portion and an uncolored portion, and a portion colored in blue contains a dye of C.I. Direct Blue 199 and a dye selected from the group consisting of red, magenta and violet colors in combination.

34. The color filter according to claim 31, wherein the dye of a red, magenta or violet color is selected from the group consisting of C.I. Acid Red 145, 157, 289 and 319, and C.I. Acid Violet 9 and 51.

35. The color filter according to claim 33, further comprising a protective layer on the resin layer.

36. The color filter according to claim 35, wherein the protective layer comprises a resin composition.

37. The color filter according to claim 35, wherein the protective layer comprises an inorganic layer.

38. The color filter according to claim 33, wherein the colored portions adjoin the light-screening areas.

39. The color filter according to claim 33, wherein the width of the uncolored portion is narrower than that of the light-screening area.

40. The color filter according to claim 33, wherein the colored portions are formed by ink dots.

41. The color filter according to claim 33, wherein a material forming the resin layer comprises a polymer containing at least water-soluble acrylic monomer units.

42. The color filter according to claim 33, wherein a material forming the resin layer comprises a water-soluble cellulosic polymer.

43. A liquid crystal display panel comprising the color filter according to any one of claims 33 to 42, a panel base provided in an opposing relation with the color filter and a liquid crystal composition enclosed in a space between the color filter and the panel base.

44. An information processor equipped with liquid crystal display panel according to claim 43.

* * * * *

UNITED STATES PATENT AND TRADEMARK OFFICE
CERTIFICATE OF CORRECTION

PATENT NO. : 5,811,209
DATED : September 22, 1998
INVENTOR(S) : EIDA ET AL.

It is certified that error appears in the above-indentified patent and that said Letters Patent is hereby corrected as shown below:

On the title page, Item [56],

References Cited:
FOREIGN PATENT DOCUMENTS,

| | | |
|---|---|---|
| "01217320 | 8/1989 | Japan |
| 1217302 | 8/1989 | Japan |
| 01235903 | 9/1989 | Japan |
| 02228605 | 9/1990 | Japan |
| 03 10220 | 1/1991 | Japan |
| 4123005 | 4/1992 | Japan |
| 04317007 | 11/1992 | Japan |
| 04349401 | 12/1992 | Japan |
| 05173010 | 7/1993 | Japan |
| 05288913 | 11/1993 | Japan" should read |
| -- 1-217320 | 8/1989 | Japan |
| 1-217302 | 8/1989 | Japan |
| 1-235903 | 9/1989 | Japan |
| 2-228605 | 9/1990 | Japan |
| 3-10220 | 1/1991 | Japan |
| 4-123005 | 4/1992 | Japan |
| 4-317007 | 11/1992 | Japan |
| 4-349401 | 12/1992 | Japan |
| 5-173010 | 7/1993 | Japan |
| 5-288913 | 11/1993 | Japan--. |

UNITED STATES PATENT AND TRADEMARK OFFICE
CERTIFICATE OF CORRECTION

PATENT NO. : 5,811,209
DATED : September 22, 1998
INVENTOR(S) : EIDA ET AL.

It is certified that error appears in the above-indentified patent and that said Letters Patent is hereby corrected as shown below:

COLUMN 14:
Line 28, "Lower" should read --lower--.

COLUMN 20:
Line 12, "claims 23 to 30" should read --claims 23 to 30,--.
Line 28, "claim 31," should read --claim 33,--.

Signed and Sealed this

First Day of June, 1999

Q. TODD DICKINSON

Attest:

Attesting Officer

Acting Commissioner of Patents and Trademarks